UNITED STATES PATENT OFFICE.

EDMUND PRATSINGER, OF GYOR, AUSTRIA-HUNGARY, ASSIGNOR OF ONE-HALF TO CARL ADLER, OF GYÖR, AUSTRIA-HUNGARY.

BRONZE-LEAF.

No. 859,106.     Specification of Letters Patent.     Patented July 2, 1907.

Application filed October 19, 1906. Serial No. 339,636.

*To all whom it may concern:*

Be it known that I, EDMUND PRATSINGER, a subject of the King of Hungary, residing at Györ, in the Kingdom of Hungary, have invented a new and useful Improvement in Bronze-Leaf, of which the following is a specification.

The present invention relates to a process for preparing the bronze leaf used in book-binding in various colors. The bronze leaf produced by this process is applicable to replace the bronze foil hitherto in use for such purposes. It is also obviously applicable to many other purposes for which this kind of material is used.

In carrying this process into effect there is added to a solution of borax in hot water gum, shellac, or the like. The solution is spread warm or after cooling upon glass or porcelain plates and on the adhesive layer so produced there is distributed bronze powder by means of plush rolls, sieves or other already known devices. The finished leaves are detached after drying by means of knives or planes. The brilliancy of the leaves can be increased by adding to the solution of borax and gum or shellac after it is cooled a quantity of glycerin, whereby a precipitate is formed. After this precipitate has settled the fluid remaining suspended above the same is utilized in the manner above described.

The proportions of the materials used may advantageously be as follows. 40 grams of borax are dissolved in half a liter of hot water and to the hot solution 60 grams of shellac are added. After cooling glycerin is added until a precipitate is formed.

The bronze leaves produced in the manner above set forth possess important advantages over those hitherto known. It has previously been usual to spread the bronze powder upon a ground formed by white color, in which process only one side of the leaf was bronzed and the white colors always appear through so that leaves of uniform bronze gloss could not be obtained. The bronze sheets produced according to the present process are bronzed on both sides because the bronze powder completely penetrates the resinous material forming the ground. The pressed sheets have a very fine uniform bronze gloss and the uniformity of the surface is further increased by the circumstance that the resinous material melts during the pressing or blocking, whereby the imprint has a massive and uniform appearance. The leaves thus obtained are not brittle and adhere without grounding to any material.

What I claim is:—

1. Process for the production of bronze leaves of any color without ground color, which consists in adding to a hot solution of borax a resinous material such as gum, shellac or the like, spreading the cool solution upon suitable surfaces and distributing bronze powder thereon, substantially as set forth.

2. Process for the production of bronze leaf of all colors without ground color, in which a solution of borax in hot water has added to it gum, shellac or the like, is then cooled, and treated with glycerin until a precipitate is formed, and the cool solution is poured on plates and covered with bronze powder, substantially as set forth.

3. As a new manufacture, bronze leaf composed of a layer of gum, shellac or the like dissolved in hot borax solution, poured upon plates and covered with bronze powder.

In testimony whereof I have signed my name to this specification in the presence of two subscribing witnesses.

EDMUND PRATSINGER.

Witnesses:
   ERNEST MULLER,
   CHARLES E. BALTZ.